United States Patent [19]

Job

[11] Patent Number: 4,874,737

[45] Date of Patent: Oct. 17, 1989

[54] SILICATE-MODIFIED MAGNESIUM ALKOXIDE POLYMERIZATION CATALYSTS

[75] Inventor: Robert C. Job, Houston, Tex.

[73] Assignee: Shell Oil Company, Houston, Tex.

[21] Appl. No.: 240,298

[22] Filed: Sep. 6, 1988

[51] Int. Cl.$^4$ .................................................. C08F 4/64
[52] U.S. Cl. .................................... 502/171; 502/104; 502/107; 502/111; 502/125; 502/134; 502/158; 502/133
[58] Field of Search ............... 502/104, 107, 111, 125, 502/133, 134, 158, 171

[56] References Cited

U.S. PATENT DOCUMENTS

| | | | |
|---|---|---|---|
| 4,400,302 | 8/1983 | Goodall et al. | 502/104 |
| 4,414,132 | 11/1983 | Goodall et al. | 502/104 |
| 4,511,669 | 4/1985 | Gessell | 502/134 X |
| 4,552,858 | 11/1985 | Imai et al. | 502/125 X |
| 4,590,247 | 5/1986 | Morguet et al. | 502/134 X |
| 4,710,482 | 12/1987 | Job | 502/127 |
| 4,780,441 | 10/1988 | Graroff | 502/107 |

*Primary Examiner*—Patrick P. Garvin
*Attorney, Agent, or Firm*—Donald F. Haas

[57] ABSTRACT

A process is disclosed for improving the productivity of a polymerization catalyst formed from a magnesium alkoxide which normally undergoes poor metathesis towards production of magnesium chloride. The process comprises treating the magnesium alkoxide with a silane alkoxide at or above the temperature at which the alcohol which is formed dissociates from the alkoxide prior to subjecting the magnesium alkoxide to metathesis.

7 Claims, No Drawings

SILICATE-MODIFIED MAGNESIUM ALKOXIDE POLYMERIZATION CATALYSTS

BACKGROUND OF THE INVENTION

This invention relates to the production of olefin polymers by polymerization with a magnesium alkoxide polymerization catalyst. More particularly, the present invention relates to the improvement of the productivity of polymerization catalysts formed from magnesium alkoxides which normally undergo poor metathesis towards production of magnesium chloride.

Experience has shown that the best magnesium chloride supported titanium tetrahalide catalysts for olefin polymerization are prepared via metathesis of a suitable magnesium compound rather than forceful mechanical and chemical treatment of magnesium chloride. Very good commercial polymerization catalysts have been prepared via metathesis of magnesium ethoxide using titanium tetrachloride in the presence of an ester and, optionally, a halohydrocarbon as disclosed in U.S. Pat. Nos. 4,400,302 and 4,414,132. It is difficult to cause the reaction between magnesium metal and ethanol and therefore magnesium is usually activated in some fashion before attempting the reaction with ethanol. Furthermore, it is extremely difficult to precipitate product (and therefrom to prepare catalysts) of controllably uniform particle size and shape. On the other hand, magnesium reacts quite exothermally with methanol to give relatively stable solutions of magnesium methoxide in methanol at room temperature. Despite the synthetic convenience of magnesium methoxide, the commercially available solid material has proven intractable towards direct metathesis with traditional chlorinating agents such as silicon- or titanium tetrahalides. It is purported that magnesium methoxide does not metathesize well because of the extreme thermodynamic stability of the polymeric forms, $[Mg(OMe)_2 \cdot MeOH]_n$ and $[Mg(OMe)_2]_n$ which are formed either upon evaporation of methanol from a $Mg(OMe)_2$ solution or as an insoluble precipitate upon boiling a methanolic $Mg(OMe)_2$ solution.

It is an object of the present invention to utilize the ease of reaction of magnesium with methanol and capitalize upon the high solubility of the reaction product in order to produce a superior catalyst precursor. A further object is to cause a beneficial transformation into magnesium ethoxide then to utilize the ease of metathesis of magnesium ethoxide to produce a highly effective polymerization catalyst.

SUMMARY OF THE INVENTION

The present invention is a process for improving the productivity of a polymerization catalyst formed from a magnesium alkoxide which normally undergoes poor metathesis towards production of magnesium chloride. The process comprises treating the magnesium alkoxide with a silane of the formula $R'_m Si(OR)_{4-m}$, where $R = C_n H_{2n+1}$, $n \geq 2$, $0 \leq m < 4$ and $R'$ may be an aryl or alkyl, prior to subjecting the magnesium alkoxide to metathesis to form the procatalyst for the polymerization catalyst. For example, the silane may be selected from the group consisting of silicon tetraethoxide, silicon tetraisopropoxide, silicon tetrabutoxide and silicon tetrapropoxide. The temperature should be at or above the temperature at which any bound alcohol dissociates from the alkoxide.

DETAILED DESCRIPTION OF THE INVENTION

Magnesium methoxide ($Mg(OMe)_2 \cdot mMeOH$ $0 \leq m \leq 4$) is one example of a magnesium alkoxide which normally undergoes poor metathesis towards production of magnesium chloride. Metathesis is the reaction of the magnesium alkoxide with a halide such as silicon tetrahalide or titanium tetrahalide, preferably the tetrachloride, to form magnesium halide which is used as the support material in a procatalyst for an olefin polymerization catalyst. Other examples of such poor metathesis magnesium alkoxides are the crystalline $Mg_4(OCH_3)_6(CH_3OH)_{10} X_2$, where X is a counter ion or ions with a total charge of $-2$; for example, it can be Cl, Br, methacrylate, butyrate, acrylate, acetate, resorcinolate, 2,4-pentanedionate, propionate, benzoate or chloroacetate. When using those compounds it is preferred that the methanol soluate be partially removed. The metathesis reaction, the formation of olefin polymerization catalysts and processes for polymerizing olefins with such catalysts are disclosed in many patents including U.S. Pat. Nos. 4,400,302, 4,414,132 and my own 4,710,482.

As discussed above, magnesium ethoxide undergoes metathesis to magnesium chloride relatively easily. One object of the present invention is to convert the magnesium alkoxide which undergoes poor metathesis to magnesium ethoxide which undergoes metathesis relatively easily. In an attempt to achieve the largest possible equilibrium shift and the most efficient alkoxide to ethoxide conversion, I recommend that the magnesium alkoxide be converted using a silane which is selected from the group consisting of $R'_m Si(OR)_{4-m}$ where R is $C_n H_{2n+1}$, $0 \leq m < 4$, $n \geq 2$ and $R'$ is an aryl or alkyl group. The preferred silane is silicon tetraethoxide because of ready and inexpensive commercial availability.

If an alcohol is bound to the original magnesium alkoxide, a portion of that will be converted to the alcohol of the silicon alkoxide. Some of this alcohol may bind to the newly formed magnesium alkoxide. Accordingly, the alkoxysilane treatment is carried out at a temperature above that necessary to dissociate that bound alcohol. Thus, if the alkoxysilane is silicon tetraethoxide, the alcohol formed is ethanol and it will dissociate from the magnesium alkoxide at or above about 105° C. in the absence of a solvent or in the presence of a higher boiling point solvent. If the bound alcohol is not removed, the efficiency of the succeeding halide metathesis reaction may be reduced. In general, the alkoxide transformation is carried out at a temperature significantly above the alcohol dissociation point for the additional reason that the reaction will occur much more rapidly at higher temperature. In some cases, in order to moderate the reactivity and to help maintain desirable precursor morphology, it might be appropriate to dilute the alkoxysilane with an unreactive solvent. In those cases the solvent chosen should boil at no lower than the above-mentioned alcohol dissociation point, i.e. about 105° C. for ethanol.

The only exception to this temperature requirement is a preferred embodiment. Lower boiling solvents such as cyclohexane and kerosene can be used if they form a lower boiling azeotrope with the alcohol. An azeotrope is preferred because it binds up alcohol and thus prevents it from catalyzing the above-mentioned polymerization of the magnesium alkoxide. The removal of the alcohol should be carried out as quickly as possible to reduce the amount of polymerization. Other suitable solvents include chlorobenzene, isooctane, decahydronaphthalene, tetrahydronaphthalene, xylene, toluene and high boiling kerosene fractions.

ILLUSTRATIVE EMBODIMENT I

Preparation of Silicate Modified Magnesium Alkoxides

Example 1

Powdered Mg(OMe)$_2$*2MeOH (20 g, 0.13 mol) was placed in a 500 ml Schlenk flask with 200 ml of silicon tetraethoxide (TEOS) and brought to distillation temperature while stirring. About 5-10 ml distilled at 67° C. (methanol), about 5 ml at 78° C. (ethanol) then the temperature rose to near 127° C. where another 20-30 ml distilled over. The head temperature was allowed to rise very slowly to about 137° C. where a final 20 ml was collected and the distillation was stopped. The flask contained a pale yellow to white glassy-crystalline mass. The crystals were washed once with TEOS, three times with icooctane, twice with isopentane then dried under moving nitrogen. Yield 13.2 g (89%). The dried crystals were gently rubbed through a 150 micron sieve whereupon 10.4 g collected on a 75 micron screen.

Example 2

Magnesium (104 g, 4.28 mol) was added portionwise to a mixture of 1.2 l of methanol and 130 ml TEOS in a 3-liter-3-neck flask. Overnight stirring yielded a crystalline slush from which no solvent could be decanted. TEOS (1500 ml) was added as the slush was gently broken up with a spatula to produce a thick milky slurry which turned cold while stirring and turned white and thickened over an hour of stirring. The extremely thick slurry was diluted in two steps: 66% was diluted with 700 ml TEOS and 33% of that was diluted to 2 l with TEOS to provide a milky slurry containing the equivalent of 22 g magnesium. The slurry was heated to a pot temperature of 93°-94° C. and allowed to reflux for 1.5 hr with vigorous stirring. The temperature was raised slowly as distillation was commenced. The entire distillate came over at 78°-80° C. as the pot temperature rose to 143° C. over about 1.5 hr. During this period the milky slurry had undergone a transformation to a suspension of grey granular material. Heating was topped and the flask allowed to cool to room temperature. Filtration of the slurry through a coarse frit was very rapid. The solid product was washed with isooctane then dried under moving nitrogen. Yield 106 g (89%). Microscopic examination revealed a narrow size distribution of glassy particles most of which seemed to be agglomerates of 5 micron particles.

Example 3

A second slurry (prepared as in Example 2) containing the equivalent of 22 g of magnesium was heated gradually to a pot temperature of 153° C. as distillate was collected over a 2-hour period. Microscopic examination revealed glassy granular particles in a narrow size distribution around 15 micron.

Example 4

Coarse crystals of kerosene desolvated magnesium methoxide (20 g, CVC Corporation) were added to 400 ml of TEOS in a 1 liter 3-neck flask. A small amount of solvent was distilled away as the pot temperature rose to 167° C. over a two hour period. The solids were collected on a coarse frit, washed with icooctane and dried under moving nitrogen. The material was still much too large to use for a standard catalyst preparation so it was rubbed through a 150 micron sieve. This example illustrates that the invention is operant in the case where there is no bound alcohol.

Example 5

A fine paste of kerosene desolvated magnesium methoxide (30 g, CVC Corporation) was added to 300 g TEOS in a 1 pt bottle and rolled in an oil bath for 1 day at 55° C., 1 day at 80° C. and 1 day at 105° C. then the glassy crystals were filtered, washed with icooctane and dried under moving nitrogen to yield 13.6 g of granular product in the 10-15 micron size range. This example illustrates that, in comparison to example #4, the glassy reaction product may be prepared in significantly shorter time when the treatment is carried out at higher temperature.

Comparative

A magnesium methoxide solution (12%) was prepared by dissolving magnesium metal, by incremental addition, into methanol which contained 0.125 equivalents of tetramethoxy silane as a stabilizer. Crystalline Mg(OMe)$_2$. 4MeOH was prepared by slow precipitation from the stabilized magnesium methoxide solution which had been concentrated by boiling. Pure magnesium methoxide was prepared from Mg(OMe)$_2$. 4MeOH by removal of methanol solvate by drying in a stream of warm nitrogen (to obtain a non-boiled precursor).

TABLE 1

| | Silicate modified magnesium alkoxides. | | | |
|---|---|---|---|---|
| Example No. | Preparative Method | Mg (% wt) | OEt/OMe (mol/mol) | Catalyst Number |
| Comp. | No TEOS reflux | 22.3 | 0 | Comp. |
| 1 | Mg(OMe)$_2$*2MeOH/TEOS reflux to 137° C. | 19.7 | — | 6 |
| 2 | Mg(OMe)$_2$/TEOS milk reflux to 143° C. | 18.5* | 1.97 | 7 |
| 3 | Mg(OMe)$_2$/TEOS milk reflux to 153° C. | 16.7 | 3.70 | 8 |
| 4 | Mg(OMe)$_2$ solid/TEOS reflux to 167° C. | 18.3 | — | 9 |
| 5 | Mg(OMe)$_2$ sand/TEOS stir at 105° C. | 20.4 | — | 10 |

*also contains 1.2% Si

Example 6

The white powder obtained from Example 1 by dry screening through a 150 micron sieve onto a 75 micron sieve (8.2 g, 66 mmol) was slurried in 200 ml of a 50/50 (vol/vol) mixture of TiCl$_4$/chlorobenzene. After adding isobutylphthalate (2.5 ml, 8.7 mmol) the mixture was heated in an oil bath and stirred at 110° C. for 60 minutes. The mixture was filtered hot and the solids slurried in 200 ml of fresh TiCl$_4$/chlorobenzene mixture. Phthaloyl chloride (0.42 ml, 2.9 mmol) and ethyl benzoate (0.37 ml, 2.6 mmol) were added and the mixture stirred at 110° C. After 60 minutes the mixture was filtered hot and the solids slurried again into 200 ml of fresh TiCl$_4$/chlorobenzene mixture. The slurry was stirred for 30 minutes at 110° C. then filtered hot. The solids were allowed to cool to 40° C. then washed with six 150 ml portions of isopentane and dried for 100 minutes under moving nitrogen at 40° C. Yield 8.0 g of pink violet catalyst. Analysis: 2.46%Ti, 18.3% Mg, 63.3% Cl.

Example 7

The white granules from Example 2 (8.2 g, 62 mmol) were slurried in 200 ml of a 50/50 (vol/vol) mixture of TiCl$_4$/chlorobenzene. After adding isobutylphthalate (2.5 ml, 8.7 mmol) the mixture was heated in an oil bath and stirred at 110° C. for 60 minutes. The mixture was filtered hot and the solids slurried in 200 ml of fresh TiCl$_4$ chlorobenzene mixture. Phthaloyl chloride (0.42 ml, 2.9 mmol) and ethyl benzoate (0.27 ml, 2.6 mmol) were added and the mixture stirred at 110° C. After 60 minutes the mixture was filtered hot and the solids slurried again into 200 ml of fresh TiCl$_4$/chlorobenzene mixture. The slurry was stirred for 60 minutes at 110° C. then filtered hot. The solids were allowed to cool to 40° C. then washed with six 150 ml portions of isopentane and dried for 100 minutes under moving nitrogen at 40° C. Yield 9.5 g of light pink catalyst. Analysis: 3.29% Ti, 17.0% Mg, 51.8% Cl, 14.1% phthalate esters, 0.81% ethylbenzoate, 0.18% ethanol, 0.72% methanol, 6.3% isopentane, less than 0.05% Si.

Example 8

The granular product from Example 3 (8.2 g, 56 mmol) was slurried in 200 ml of a 50/50 (vol/vol) mixture of TiCl$_4$/chlorobenzene. After adding isobutylphthalate (2.5 ml, 8.7 mmol) the mixture was heated in an oil bath and stirred at 110° C. for 60 minutes. The mixture was filtered hot and the solids slurried in 200 ml of fresh TiCl$_4$/chlorobenzene mixture. Phthaloyl chloride (0.42 ml, 2.9 mmol) and ethyl benzoate (0.37 ml, 2.6 mmol) were added and the mixture stirred at 110° C. After 60 minutes the mixture was filtered hot and the solids slurried again into 200 ml of fresh TiCl$_4$/chlorobenzene mixture. The slurry was stirred for 30 minutes at 110° C. Then filtered hot. The solids were allowed to cool to 40° C. then washed with six 150 ml portions of isopentane and dried for 100 minutes under moving nitrogen at 40° C. Yield 8.9 g of medium pink catalyst. Analysis: 2.55% Ti, 18.3% Mg, 8.38% phthalate esters, 0.58% ethylbenzoate, 0.16% ethanol, 0.49% methanol, 0.24% isopentane. Crystallite size (via X-ray powder diffraction) 82 A.

Example 9

The granular product from Example 4 (5.8 g, 44 mmol) was slurried in 150 ml of a 50/50 (vol/vol) mixture of TiCl$_4$/chlorobenzene. After adding isobutylphthalate (1.74 ml, 5.9 mmol) the mixture was heated in an oil bath and stirred at 110° C. for 60 minutes. The mixture was filtered hot and the solids slurried in 150 ml of fresh TiCl$_4$/chlorobenzene mixture. p-Toluoyl chloride (0.35 ml, 2.6 mmol) was added and the mixture stirred at 110° C. After 60 minutes the mixture was filtered hot and the solids slurried again into 150 ml of fresh TiCl$_4$/chlorobenzene mixture. The slurry was stirred for 30 minutes at 110° C. then filtered hot. The solids were allowed to cool to 40° C. then washed with six 150 ml portions of isopentane and dried for 100 minutes under moving nitrogen at 40° C. Yield 5.7 g of light green catalyst. Analysis: 2.95% Ti, 18.4% Mg.

Example 10

The granular product from Example 5 (5.8 g, 49 mmol) was slurried in 150 ml of a 50/50 (vol/vol) mixture of TiCl$_4$/chlorobenzene. After adding isobutylphthalate (1.74 ml, 5.9 mmol) the mixture was heated in an oil bath and stirred at 110° C. for 60 minutes. The mixture was filtered hot and the solids slurried in 150 ml of fresh TiCl$_4$/chlorobenzene mixture. p-Toluoyl chloride (0.35 ml, 2.6 mmol) was added and the mixture stirred at 110° C. After 60 minutes the mixture was filtered hot and the solids slurried again into 150 ml of fresh TiCl$_4$/chlorobenzene mixture. The slurry was stirred for 30 minutes at 110° C. then filtered hot. The solids were allowed to cool to 40° C. then washed with six 150 ml portions of isopentane and dried for 100 minutes under moving nitrogen at 40° C. Yield 5.8 g of light green catalyst. Analysis: 2.75% Ti, 18.9% Mg.

Comparative

A catalyst was prepared by stirring 50 mmols of the nitrogen desolvated magnesium compound with 2.5 ml of isobutyl phthalate in 200 ml of 50/50 titanium tetrachloride/chlorobenzene for 1 hour at 115° C. followed by two washes at 115° C. with that same solvent mixture. Excess titanium was removed by exhaustive isopentane rinses and the catalyst was dried under moving nitrogen at 40° C.

Autoclave Polymerizations

The component ratios, mode of injection, productivity, xylene solubles and the polymer bulk densities for polymerizations using the above catalysts are shown in Table 2. For LIPP polymerizations the autoclave was charged with 2.7 l propylene and 132 mmol hydrogen then heated to 65° C. whereupon the catalyst components were injected. Polymerization was then carried out at 67° C. for 2 hours (or 1 hour where indicated). The catalyst components were either premixed 20 minutes prior to injection or injected without premixing in the order:

(1) Diphenyldimethoxysilane (DPDMS) for catalyst nos. 6-10 and diisobutyldimethoxysilane for the comparative example;

(2) Triethylaluminum (TEA); (3) Procatalyst. For gas phase polymerizations the catalyst components were injected (using 50 ml of isopentane to provide a prebath) into an autoclave containing flowing propylene vapor (10 g/min) maintained at 300 psi and polymerized at 67° C. for two hours.

TABLE 2

| Two hour autoclave runs utilizing catalysts of Examples 6-10. | | | | | | |
|---|---|---|---|---|---|---|
| Catalyst Examp. # | Ti (% wt) | TEA/DPDMS/Ti (mmol/mmol/umol) | Productivity | | X.S. (% wt) | B.d. (g/cc) |
| | | | Kg/g Ti | Kg/g cat | | |
| Comp. | 4.45 | .56/.14/6 p | 171 | 7.6 | 8.1 | .34 |
| 6 | 2.46 | .56/.14/6.4 n | 2003 | 49.3 | 4.3 | .355 |
| | | .56/.14/6.5 n | 2009 | 49.4 | 3.9 | .345 |
| | | .56/.14./6.4 p | 1904 | 46.8 | 3.6 | .385 |

TABLE 2-continued

Two hour autoclave runs utilizing catalysts of Examples 6-10.

| Catalyst Examp. # | Ti (% wt) | TEA/DPDMS/Ti (mmol/mmol/umol) | Productivity Kg/g Ti | Kg/g cat | X.S. (% wt) | B.d. (g/cc) |
|---|---|---|---|---|---|---|
|  |  | .56/.14/8/150 n gas | 1200 | 29.5 | 5.6 | — |
|  |  | .56/.105/8/150 n gas | 974 | 24.0 | 4.6 | — |
| 7 | 3.29 | .56/.14/8.2 p | 1769 | 58.2 | 2.0 | .30 |
|  |  | .32/.010/4.3 p | 2185 | 71.9 | 5.0 | .29 |
| 8 | 2.55 | .42/.105/4.3 p | 2906 | 74.1 | 2.8 | .315 |
|  |  | .32/.014/3.3 p | 3294 | 84.0 | 3.9 | .30 |
|  |  | .32/.010/4.3 p | 3124 | 79.7 | 6.6 | .305 |
|  |  | .32/.014/3.3 p (1 hr) | 2154 | 54.9 | 3.6 | — |
| 9 | 2.95 | .56/.105/6.2 p (1 hr) | 1644 | 48.5 | 5.0 | .31 |
| 10 | 2.75 | .56/.105/5.7 p (1 hr) | 1564 | 43.0 | 3.8 | .31 | n — catalyst components injected separately
p — catalyst components premixed 20 min before injection It can clearly be seen by reviewing the results shown in Table 2 that the process of the present invention gives an increase in the productivity of the catalyst. For example, compare the results of the polymerization for the comparative catalyst with the results of the other liquid phase polymerizations. The productivities of the invention catalysts are clearly much higher than the productivity of the comparative catalyst. The bulk density of the product made with catalyst 6 is much higher. An increase in bulk density can be an additional advantage of the use of the process of the present invention.

Illustrative Embodiment II

My U.S. Pat. No. 4,710,482 discloses the use of the $Mg_4(OCH_3)_6(CH_3OH)_{10}X_2$ crystal in a polymerization catalyst. This magnesium alkoxide is another magnesium alkoxide which undergoes metathesis with some difficulty. As shown below, after treatment with tetraethoxysilane, the crystals may be subjected to metathesis to give a high activity catalyst which is capable of producing polypropylene of high bulk density with low fines and a relatively narrow particle size distribution.

Catalyst Preparation

Invention 1

Into about 400 ml of cyclohexane in a 1 pt bottle were placed 36 g of roughly dodecahedral $Mg_4(OCH_3)_6(C-H_3OH)_{10}Cl_2$. Over the course of 3 hours about ⅓ of the solvent was boiled away. The filtered and dried product weighed 26.5 g, corresponding to the loss of 56% of the methanol solvate. The entire 26.5 g was slurried with 600 ml of tetraethoxysilane (TEOS) in a 1 liter 3-neck flask equipped with a teflon paddle stirrer and a distillation condenser. Under slow stirring the vessel was gently heated to a pot temperature of 155° C. where the first distillate was observed. As distillate was removed over the next 2 hours the pot temperature had increased to to 167° C. Distillation was stopped after 6 hours when the pot temperature had reached 169° C. and 70 ml of distillate had been collected. The solids were collected by decantation when washed with isooctane and dried under moving nitrogen. The yield was 22.3 g of granular product in the 30 to 80 micron size range which appeared somewhat more transparent than the cyclohexane boiled starting material. Analysis: 21.74% Mg and 15.70% Cl.

The granular product (6.0 g, 53.7 mmol) was slurried in 200 ml of a 50/50 (vol/vol) mixture of $TiCl_4$/chlorobenzene. After adding isobutylphthalate (2.5 ml, 8.7 mmol) the mixture was heated in an oil bath and stirred at 115° C. for 60 minutes. The mixture was filtered hot and the solids slurried in 200 ml of fresh $TiCl_4$/chlorobenzene mixture. Phthaloyl chloride (0.5 ml, 3.4 mmol) and p-toluoyl chloride (0.5 ml, 3.7 mmol) were added and the mixture stirred at 115° C. After 60 minutes the mixture was filtered hot and the solids slurried again into 200 ml of fresh $TiCl_4$/chlorobenzene mixture. The slurry was stirred for 30 minutes at 115° C. then filtered hot. The solids were then slurried into 100 ml of fresh $TiCl_4$/chlorobenzene mixture, heated at 115° C. for 10 min and filtered hot. The solids were allowed to cool to 40° C. then washed with six 150 ml portions of isopentane and dried for 100 minutes under moving nitrogen at 40° C. The yield was 6.4 g of violet catalyst. Analysis: 2.18% Ti, 20.9% Mg. A comparative catalyst was made by repeating the above synthesis except: 10 gm of the crystalline $Mg(OMe)_6(MeOH)_{10}Cl_2$ was used as the magnesium source, 2.8 ml of isobutyl phthalate were used, 0.1 ml of phthaloyl chloride, no p-toluoyl chloride was used and there was no TEOS boiling step. Analysis: 3.41% Ti, 19.6% mg.

Invention 2 (Cyclohexane and TEOS treatment combined into one step)

Into a solution of 300 g of cyclohexane and 120 g TEOS were placed 40 g of dodecahedral $Mg_4(OMe)_6$-$(MeOH)_{10}Cl_2$ crystals. The slurry was boiled gently until a 20–30% volume decrease had occurred. The solids were collected by filtration, washed once with isooctane and dried under moving nitrogen. Yield 29.2 g of translucent, dodecahedral crystals. The procatalyst was prepared exactly as in Invention 1 above. Analysis: 1.51% Ti, 19.9% Mg.

The LIPP polymerization results are shown in the Table. It is seen that the productivity is significantly greater for catalyst prepared from the TEOS treated material. Furthermore, the selectivity towards isotactic polymer (as measured by the xylene solubles content) is also significantly improved. Using the above polymerization procedure, the following results were obtained.

TABLE 3

Comparison of 1 hour productivities in 67° C. LIPP polymerizations.

| Catalyst No. | Ti (% wt) | TEA/SCA/Ti (mmol/mmol/umol) | Productivity Kg/g Ti | Kg/g cat | X.S. (% wt) | B.d. (g/cc) |
|---|---|---|---|---|---|---|
| Comp. | 3.41 | 2.2/.14/9.5 n | 765 | 26.1 | 7.7 | — |

TABLE 3-continued

| Catalyst No. | Ti (% wt) | TEA/SCA/Ti (mmol/mmol/umol) | Productivity Kg/g Ti | Productivity Kg/g cat | X.S. (% wt) | B.d. (g/cc) |
|---|---|---|---|---|---|---|
| Invention 1 | 2.18 | .56/.05/6.5 p | 1663 | 36.3 | 4.0 | 0.38 |
| Invention 2 | 1.51 | .56/0.97/4.5 p | 2225 | 33.6 | 3.7 | 0.37 |

Comparison of 1 hour productivities in 67° C. LIPP polymerizations.

n — catalyst components injected separately
p — catalyst components premixed 20 min before injection
SCA — diphenyldimethoxysilane for comp.
SCA — diisobutyldimethoxysilane for invention catalysts Another dramatic improvement over the comparative catalyst is shown in the particle size distribution of the polymer. There it is seen that the total amount of particles falling below 120 microns is only about 1/5 of those found in the comparative catalyst polymerization.

Illustrative Embodiment III

Catalyst Preparation

Into an 8 oz jar was placed 18.4 g of porous silica microspheres of 17 micron average particle size. Over the course of about 15 min 41 g of 12% methanolic magnesium methoxide was added dropwise, while stirring with a spatula, to yield about 59 g of a dry free flowing powder. The powder was allowed to stand under flowing nitrogen until the weight had decreased to about 28 gm (1 hr). The entire quantity of dry powder was slurried with 500 g of tetraethoxysilane (TEOS) in a 1 liter 3-neck flask equipped with a teflon paddle stirrer and a distillation condenser. Under slow stirring the vessel was gradually heated (over a 30 hr period) to a pot temperature of 154° C. while about 15 ml of distillate had been collected. The solids were collected by filtration then washed with isooctane and dried under moving nitrogen. Yield 30.1 g of free flowing powder which appeared somewhat more opaque than the starting material.

The powder (26.9 g) was slurried in 150 ml of a 50/50 (vol/vol) mixture of TiCl₄/chlorobenzene. After adding isobutylphthalate (1.74 ml, 6.0 mmol) the mixture was heated in an oil bath and stirred at 110° C. for 60 minutes. The mixture was filtered hot and the solids slurried in 150 ml of fresh TiCl₄/chlorobenzene mixture. p-Toluoyl chloride (0.5 ml, 3.7 mmol) was added and the mixture stirred at 110° C. After 60 minutes the mixture was filtered hot and the solids slurried again into 150 ml of fresh TiCl₄ chlorobenzene mixture. The slurry was stirred for 30 mintues at 110° C. then filtered hot. The solids were allowed to cool to 40° C. then washed with six 150 ml portions of isopentane and dried for 100 minutes under moving nitrogen at 40° C. Yield 21.1 g of pale biege catalyst A. Analysis: 2.63% Ti, 4.09% Mg.

Into an 8 oz. bottle were placed 110 g of 12% methanolic magnesium methoxide solution and 9.0 g of porous silica microspheres of 17 micron average particle size. Over the course of 2 hours about 44 g of the solvent was boiled away (to yield an approximately 20% solution of magnesium methoxide). The slurry was filtered hot, through a coarse glass fritted funnel, then the solids washed twice with a 25% solution of isopropanol in isooctane and dried for 1 hour under moving nitrogen. The entire amount of dried powder was slurried with 500 g of tetraethoxysilane (TEOS) in a 1 liter 3-neck flask equipped with a teflon paddle stirrer and a distillation condenser. Under slow stirring the vessel was rapidly heated (over a 2 hr period) to a pot temperature of 164° C. while about 10 ml of distillate had been collected. After overnight stirring at 164° C. the solids were collected by filtration then washed with isooctane and dried under moving nitrogen. Yield 25.6 g of clusters of spheres.

The powder (22.9 g) was slurried in 150 ml of a 50/50 (vol/vol) mixture of TiCl₄/chlorobenzene. AFter adding isobutylphthalate (1.74 ml, 6.0 mmol) the mixture was heated in an oil bath and stirred at 110° C. for 60 minutes. The mixture was filtered hot and the solids slurried in 200 ml of fresh TiCl₄/chlorobenzene mixture. p-Toluoyl chloride (0.5 ml, 3.7 mmol) was added and the mixture stirred at 110° C. After 60 minutes the mixture was filtered hot and the solids slurried again into 200 ml of fresh TiCl₄/chlorobenzene mixture. The slurry was stirred for 30 mintues at 110° C. then filtered hot. The solids were allowed to cool to 40° C. then washed with six 150 ml portions of isopentane and dried for 100 minutes under moving nitrogen at 40° C. Yield 21.5 g of pale beige catalyst B.

TABLE 4

Comparison of 1 hour productivities in 67° C. LIPP polymerizations.

| Catalyst No. | Ti (% wt) | TEA/SCA/Ti (mmol/mmol/umol) | Productivity Kg/g Cat | X.S. (% wt) | B.d. (g/cc) |
|---|---|---|---|---|---|
| A | 2.63 | 1.0/.35/10 p (1 hr) | 8.2 | 3.2 | .43 |
|  |  | 1.0/.35/10 p (1 hr) | 8.7 | 3.4 | .43 |
| B | 4.24 | .56/.10/21 p (1 hr) | 13.4 | 5.0 | .40 | p — catalyst components premixed 20 min before injection
SCA = diphenyldimethoxysilane for comp.
SCA = diisobutyldimethoxysilane for A and B.

The results shown in the above Table 4 indicate that it is possible to make a catalyst according to the present invention which will give polymer with greatly increased bulk density over the comparative catalyst from Table 2. The productivities were expectedly low because of the dilution with the inert silica support.

Illustrative Embodiment IV

As in Illustrative Embodiment II, magnesium compounds of the formula Mg₄(OCH₃)₆ (CH₃OH)₁₀ X₂ were used to prepare polymerization catalysts. In one experiment, X was chlorine and in the other, X was resorcinol. The desolvation was carried out by using 40 grams of the appropriate magnesium compound slurried in 300 grams of cyclohexane containing 120 grams of triethoxy silane. This slurry was then boiled until a decrease of 20-30% in solvent volume had occurred.

The catalysts were prepared by stirring 50 millimols of the magnesium compound with 2.5 ml of isobutyl phthalate in 200 ml of 50/50 titanium tetrachloride/chlorobenzene for 1 hour at 115° C. followed by two washes at 115° C. with that same solvent mixture. Excess titanium was removed by exhaustive isopentene rinses and the catalyst was dried under moving nitrogen at 40° C. Propylene was then polymerized using this catalyst in combination with triethyl aluminum and diisobutyl dimethoxysilane as cocatalysts. The polymerization was carried out for 1 hour at 67° C. in a LIPP reactor. With the catalysts where X was chlorine, the productivity was 33.6 kg of polypropylene per gram of catalyst-hr. and the xylene solubles were 3.7%. In the catalysts where X was resorcinol, the productivity was 53.5 kg polypropylene per gram of catalyst-hr. and the xylene solubles were 3.4%.

Illustrative Embodiment V

12% magnesium methoxide solutions were prepared by dissolving magnesium metal by incremental addition into methanol which contained 0.125 equivalents of tetramethoxysilane as a solution stabilizer. Crystalline magnesium methoxide-Mg(OMe)$_2$.4MeOH was prepared by slow precipitation from magnesium methoxide solutions which were first concentrated by boiling. Pure magnesium methoxide was prepared from Mg(OMe)$_2$.4MeOH by removal of methanol solvate by either drying it in a stream of warm nitrogen or by azetropic distillation from kerosene. A partial conversion to ethoxide was affected by slurrying Mg(OMe)$_2$.4MeOH in tetraethoxysilane to obtain a fine powder. More complete conversion to ethoxide was effected by boiling any of the above-described solid materials in tetraethoxysilane up to a temperature of about 165° C.

Catalysts were prepared from these materials by stirring 50 to 60 mmols of the appropriate magnesium compound with 2.5 ml of isobutyl phthalate and 200 ml of 50/50 titanium tetrachloride/chlorobenzene for 1 hour at 150° C. followed by two washes at 115° C. with that same solvent mixture. Excess titanium was removed by exhaustive isopentane rinses and the catalyst was dried under moving nitrogen at 40° C.

The catalysts were then used to polymerize propylene in a LIPP reactor. The polymerizations were of 1 hour duration at 67° C. with a mixture of triethylaluminum and diisobutyldimethoxysilane as cocatalysts. The results are shown in the following table:

TABLE 5

| | Evaluation of catalysts prepared with magnesium methoxide. | | | |
|---|---|---|---|---|
| Example | Precursor | Productivity kg PP/g cat hr. | XS % wt | B.d. g/cc |
| Comp. 1 | N$_2$ dry Mg(OMe)$_2$.4MeOH | 7.6 | 8.1 | 0.34 |
| Comp. 2 | Precipatate of Mg(OMe)$_2$.4MeOH with TEOS | 23.4 | 4.8 | 0.405 |
| Invention | TEOS boil of TEOS precipitate above | 54.9 | 3.6 | 0.30 |
| Comp.3 | Boil Mg(OMe)$_2$.4MeOH in kerosene | 29.1 | 4.5 | 0.43 |
| Invention | TEOS boil of kerosene precipitate | 48.5 | 5.0 | 0.31 |

TEOS = tetraethoxysilane
X.S. = xylene solubles
B.d. = polymer bulk density

It can be seen that all of the treatments which were carried out on dry magnesium methoxide increased its productivity. However, when the TEOS and kerosene precipitates were boiled in TEOS, there was a dramatic increase in the productivity of the catalyst.

I claim as my invention:

1. A process for improving the productivity of a polymerization catalyst formed from a magnesium alkoxide which normally undergoes poor metathesis towards production of magnesium chloride, which comprises treating said magnesium alkoxide with a silane of the formula R'$_m$Si(OR)$_{4-m}$ where R=C$_n$H$_{2n+1}$, n≧2, 0≦m<4 and R' may be an aryl or alkyl, wherein an alcohol may be formed and become bound to the alkoxide, at or above the temperature at which the alcohol formed would dissociate from the alkoxide prior to subjecting said magnesium alkoxide to metathesis.

2. The process of claim 1 wherein the silane is selected from the group consisting of silicon tetraethoxide, silicon tetraisopropoxide, silicon tetrabutoxide and silicon tetrapropoxide.

3. The process of claim 1 wherein the temperature is at least about 105° C.

4. The process of claim 1 wherein the silane is diluted with an unreactive solvent.

5. The process of claim 4 wherein the solvent is selected from the group consisting of kerosene, cyclohexane, chlorobenzene, isooctane, decahydronaphthalene, tetrahydronapthalene, xylene and toluene.

6. The process of claim 1 wherein the magnesium alkoxide is selected from the group consisting of magnesium ethoxide and Mg$_4$(OCH$_3$)$_6$ (CH$_3$OH)$_{10}$ X$_2$ where X is a counter ion or ions with a total charge of −2.

7. The process of claim 1 wherein the silane is silicon tetraethoxide.

* * * * *